Dec. 10, 1957  D. W. MOLINS ET AL  2,815,759
MACHINES FOR MANIPULATING CUT TOBACCO
Filed Aug. 14, 1952  9 Sheets-Sheet 1
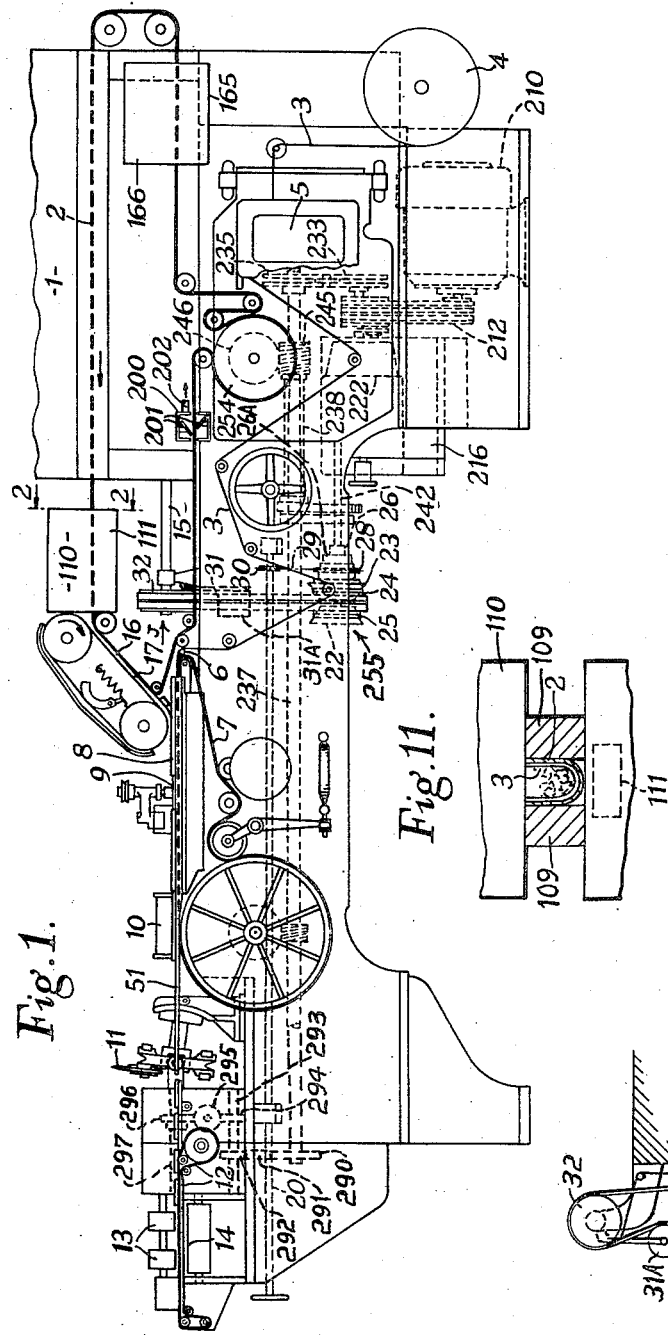
INVENTORS
Desmond W. Molins
Gordon F. W. Powell
BY Watson Cole, Grindle
& Watson
ATTORNEYS Dec. 10, 1957   D. W. MOLINS ET AL   2,815,759
MACHINES FOR MANIPULATING CUT TOBACCO
Filed Aug. 14, 1952   9 Sheets-Sheet 2
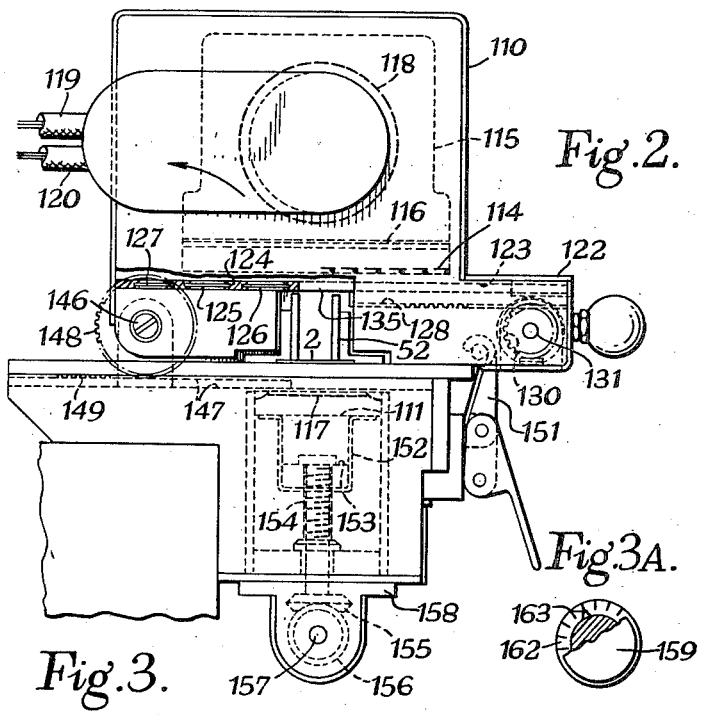
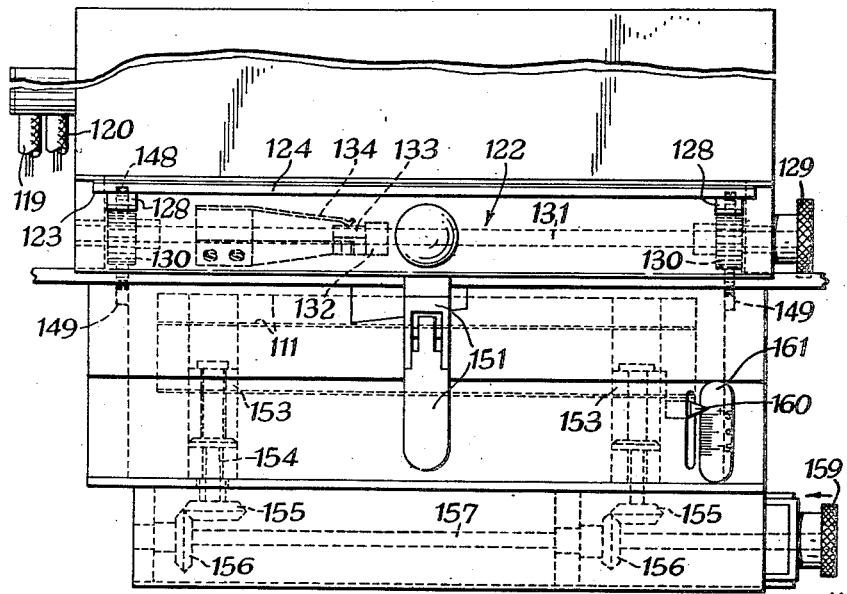
INVENTORS
Desmond W. Molins
Gordon F. W. Powell
BY Watson, Cole,
Grindle & Watson
ATTORNEYS Dec. 10, 1957 D. W. MOLINS ET AL 2,815,759
MACHINES FOR MANIPULATING CUT TOBACCO
Filed Aug. 14, 1952 9 Sheets-Sheet 3

INVENTORS
Desmond W. Molins
Gordon F. W. Powell
BY Watson, Cole,
Grindle & Watson
ATTORNEYS

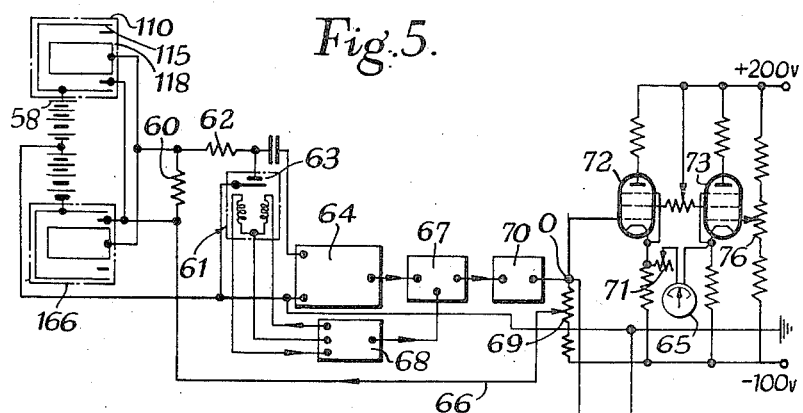
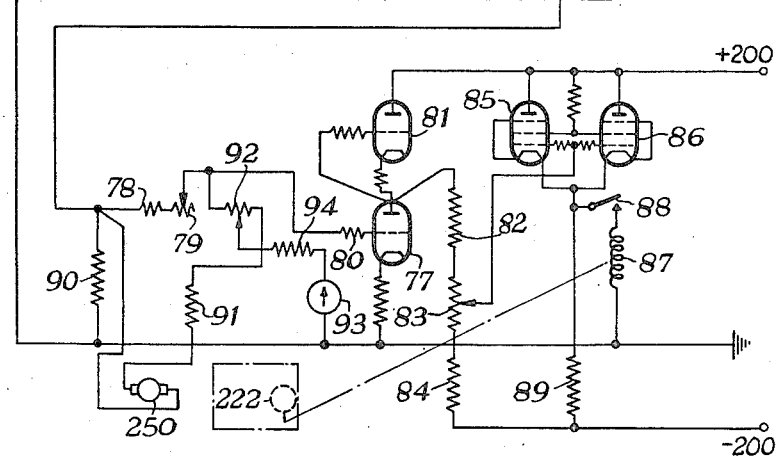
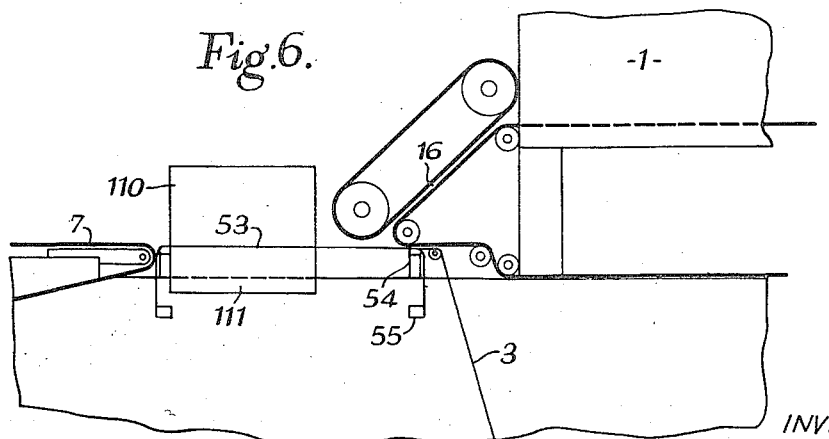

Dec. 10, 1957     D. W. MOLINS ET AL     2,815,759
MACHINES FOR MANIPULATING CUT TOBACCO
Filed Aug. 14, 1952     9 Sheets-Sheet 6
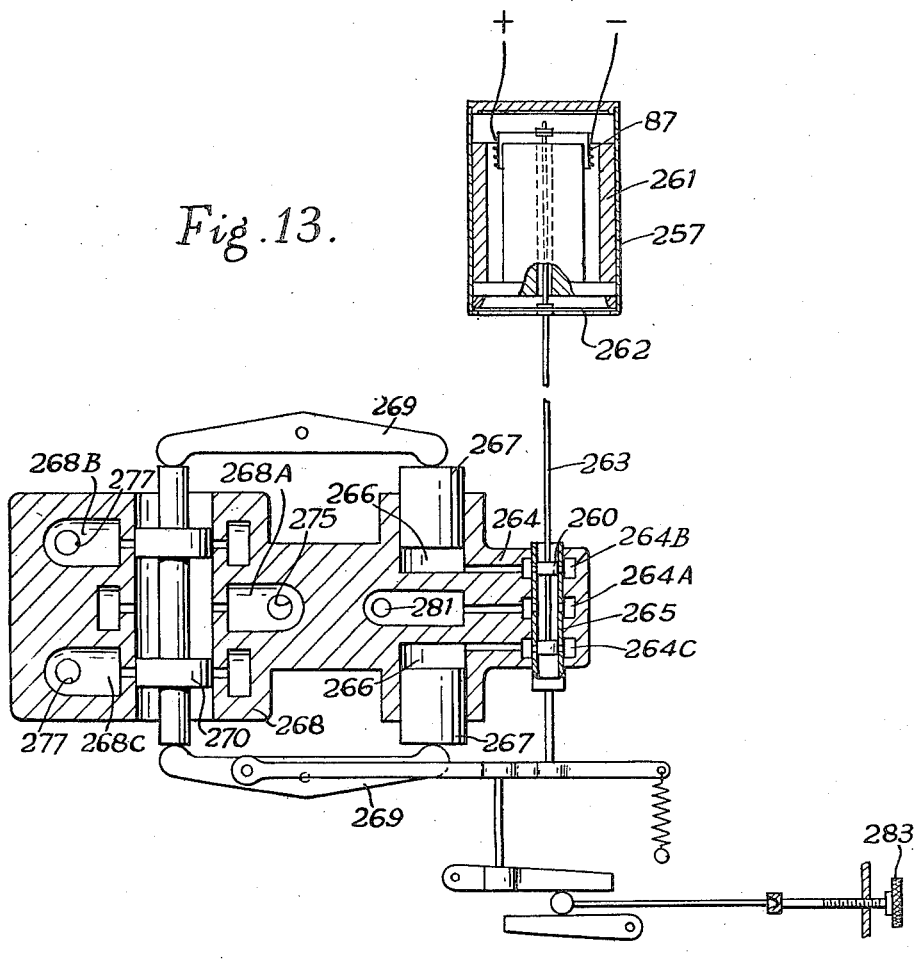
Fig. 13A
INVENTORS
Desmond W. Molins,
Gordon F. W. Powell
BY
Watson, Cole, Grindle & Watson
ATTORNEYS

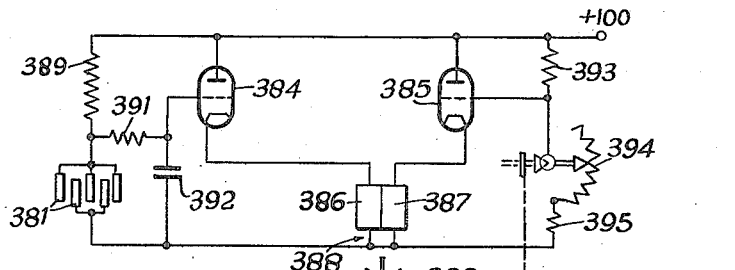
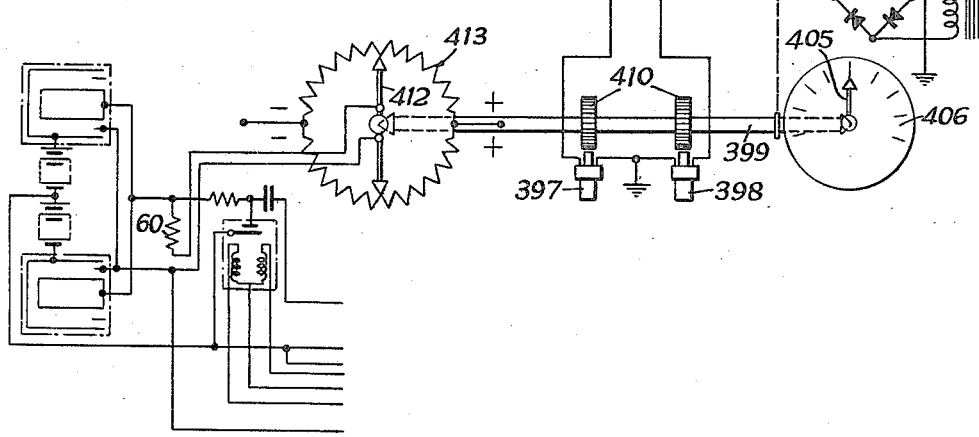
Fig. 15.
Fig. 17.
Fig. 18.
INVENTORS
Desmond W. Molins,
Gordon F. W. Powell
BY
Watson, Cole, Grindle y Watson
ATTORNEYS

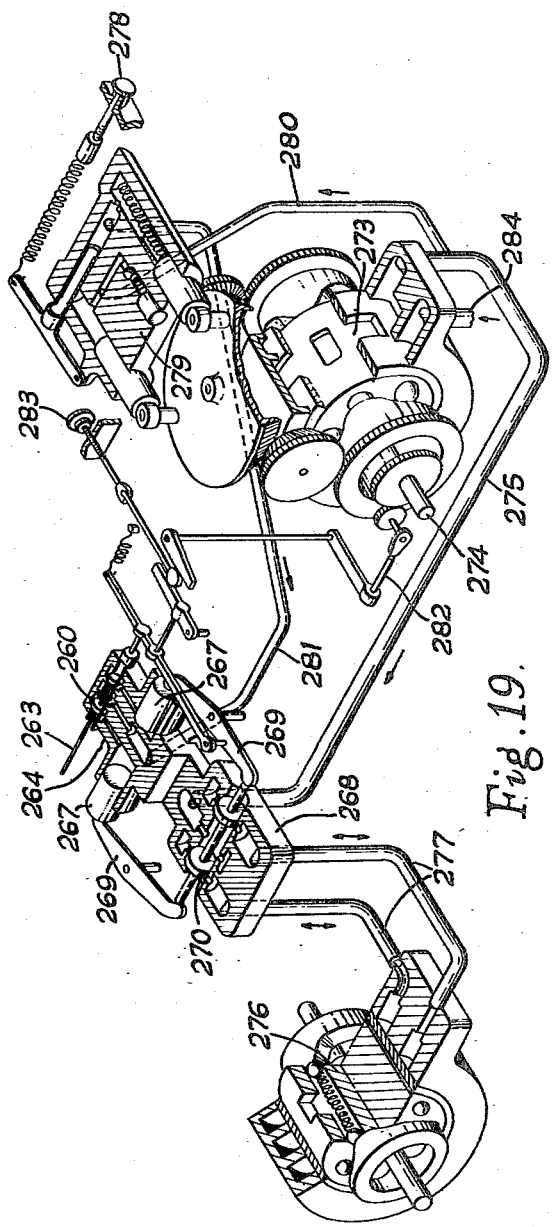

United States Patent Office

2,815,759
Patented Dec. 10, 1957

2,815,759

MACHINES FOR MANIPULATING CUT TOBACCO

Desmond Walter Molins and Gordon Francis Wellington Powell, Deptford, London, England, assignors to Molins Machine Company Limited, London, England, a British company Application August 14, 1952, Serial No. 304,412

Claims priority, application Great Britain August 15, 1951

29 Claims. (Cl. 131—21)

This invention concerns improvements in or relating to machines for manipulating cut tobacco for example cigarette making machines. In tobacco manipulating machines cut tobacco is fed and may subsequently issue from the machine in separated portions, e. g. as cigarettes in a cigarette making machine or as packages in a tobacco packaging machine.

In all tobacco manipulating machines cut tobacco is removed from a mass and spread in some way on a conveyor which carries it as a continuous stream or filler through or towards devices which manipulate it to form it into a continuous tobacco rod which may eventually be enclosed in a continuous paper wrapper. The best known example of such a machine is the continuous rod cigarette making machine.

Cigarette making machines of the continuous rod type are provided with tobacco feeding apparatus in which a mass of cut tobacco is placed in a hopper and subjected to various brushing and combing operations and finally showered on to a conveyor where it forms a loose tobacco filler and by means of which, or a succeeding conveyor, it is formed into a tobacco rod or core which is afterwards wrapped in paper.

Owing to the nature of the mechanism used in the tobacco feeding apparatus, the quantity of tobacco showered varies according to several conditions, such for example, as the moisture contained in the tobacco, the temperature, the nature of the tobacco and the degree to which it is tangled when it is first placed in the hopper. In other words the showering rate is not constant and many attempts have been made to improve the uniformity of distribution of the tobacco in the resulting rod. Hitherto the practice has been to alter the speed of the hopper so that more or less tobacco is showered.

The most usual practice employed for checking the average density of the cigarettes produced has been to weigh them either singly or in batches at suitable intervals and the result of the weighing operations has been used, usually by automatic means, to alter the speed of the hopper by means of a variable speed gear which is employed on a continuous rod cigarette making machine so that the speed of the tobacco feeding apparatus can be altered without altering the speed of the cigarette making machine proper.

More recently various proposals have been made by means of which the tobacco content or density of tobacco in a stream is to be checked or maintained by electrical methods, usually by measuring the resistance thereof to high frequency currents or by determining the capacity of a quantity of tobacco passing through a condenser device. The result of the electrical measurement is to be used to alter the speed of the tobacco feeding apparatus through a system of relays and other electrical apparatus.

All continuous rod cigarette machines have the tobacco feeding apparatus and the conveyor (which may be one of a conveyor system) as noted above but there is great diversity in the conveyor systems used on different machines.

In some machines the cigarette paper web extends practically from end to end of the machine, forming the shower receiving conveyor where it passes through the hopper, and thereafter conveying the tobacco along while it is pressed and shaped to the final form, during which operations the web is folded round the tobacco to form the continuous wrapped rod.

In other machines the tobacco is showered on to an endless band (called herein "hopper tape") and discharged therefrom on to a travelling paper web, or possibly to a further endless band, which delivers it to the paper web. In some machines of this class the hopper tape is arranged to run faster than the paper web so that a loose filler on the tape, formed by the shower, changes to a more compact filler on the web. In machines where a hopper tape is employed this may be arranged at a higher level than the conveyor (e. g. the paper web) to which it delivers its tobacco.

For convenience the term "filler" shall be deemed to mean any assemblage or substantially regular flow of particles of cut tobacco moving past a given position in a machine such as, for example, a loose continuous stream of tobacco, or an unwrapped tobacco rod formed from such a stream or the wrapped rod. Hereafter the specification will describe the invention as applied to fillers in the form of a loose continuous stream, or an unwrapped rod, or a wrapped rod, in a cigarette machine, but it will be readily appreciated that the same principles can be applied for any filler, that is a quantity of tobacco which has been drawn from a mass in a supply hopper and manipulated to provide a substantially regular flow of particles.

Where the density or quantity of tobacco in the filler can be accurately measured or the cigarettes are accurately weighed and the hopper speed is altered in response to the result of such measurement or weighing, the performance of a cigarette machine is improved, but it is desired to increase its efficiency still further.

An object of the invention is to provide means whereby a measuring or detecting operation is effected on the filler and a correction called for by the measuring or like operation can be made without appreciable delay.

According to the invention there is provided a tobacco manipulating machine comprising conveyor means for supporting and conveying a filler, means for showering cut tobacco from a source of supply on to part of said conveyor means and forming a filler from said tobacco, a measuring device capable of measuring the amount of tobacco in the range of said device at any given instant, and means responsive to the measuring device and operative to alter the speed of a part at least of said conveyor means according to the variation of the quantity of tobacco in the range of the measuring device at a given time from a desired value whereby the change in speed causes the filler carried on that part of the conveyor means whose speed is affected to move faster or slower as the measuring device shows a variation from the desired value in the quantity of tobacco so measured at any given time.

Measurement or detection may be effected by electrical methods or by determining the absorption of rays such as those from a beta ray device.

A suitable form of measuring or detecting device is a beta ray radiator and an ionisation chamber, the filler being arranged to pass between radiator and chamber so that the mass of the passing tobacco may be determined by determining changes in the absorption of rays with variations in the mass by means of said chamber.

The current resulting from a voltage applied to the electrodes of the chamber, when the gas therein is ionised, may be, by suitable amplifying and other apparatus, caused to control a suitable electric motor or other suitable actuator and the movements of this actuator can be utilised to vary the speed of the conveyor system, or a part thereof with respect to the hopper. For this purpose the actuator may be arranged to alter a variable speed gear which drives the conveyor system.

The apparatus may comprise two ionisation chambers, each with its co-operating source of rays, one chamber and ray source being arranged to test the tobacco mass and the other chamber and source being arranged for use as a balancing device, as explained later, having a given material mass positioned between source and chamber. The balancing device may be adjustable, as by shifting the source towards or away from the chamber or by insertng a greater or lesser quantity of the said material mass. The device is so arranged or adjusted that its absorption of rays is equal to that of a filler of the desired value.

The invention will be more fully described with reference to the accompanying drawings, which show, by way of example, its application to one kind of cigarette making machine and diagrams of other cigarette machines of known kind to which it can be applied.

In the drawings:

Figure 1 is a diagrammatic front elevation of one kind of continuous rod cigarette-making machine showing the application of the invention thereto.

Figure 1A is a view of a part of Figure 1 looking in the direction of the arrow J.

Figure 2 is a section of Figure 1 on the line 2—2 to a much larger scale, showing an end view of an ionisation chamber and associated parts.

Figure 3 is a front elevation of Figure 2.

Figure 3A is an end view of part of Figure 3 looking in the direction of the arrow.

Figure 5 is a circuit diagram of beta ray measuring devices and speed control devices.

Figure 6 is a diagrammatic view of part of Figure 1 showing an ionisation chamber in a different position and some necessary modifications.

Figure 11 shows guiding arrangements where the filler is carried on a U shaped conveyor.

Figure 13 is a sectional diagram of a magnetically controlled valve.

Figure 13A is a detail of Figure 13.

Figure 15 shows a circuit for use when the moisture content of the tobacco is to be considered in the measured mass of a filler.

Figures 17 and 18 are side and front elevations respectively of a roller used in Figure 16.

Figure 19 is a sectional diagram of an oil unit used with the machine.

Figure 4:
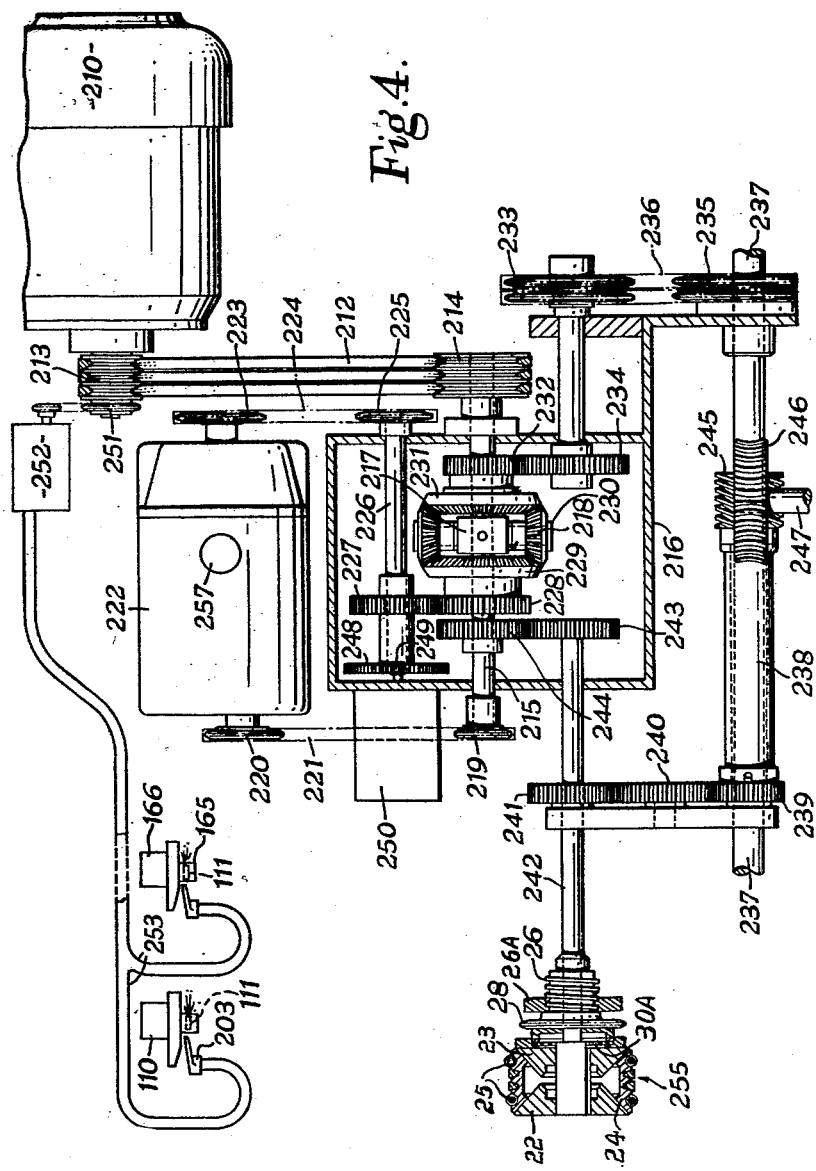
Figure 4 is a plan view of driving arrangements for the machine shown in Figure 1 partly in section and also shows in diagrammatic form devices for blowing dust from the ray boxes.

Referring first to Figure 1 the cigarette machine is provided with a tobacco feeding apparatus 1 which showers tobacco on a travelling endless belt or tape 2. This tape is often called the hopper tape. A paper web 3 is drawn from a reel 4 over the various rollers shown, passing through a printer or the like 5 and finally over a small roller 6 which leads it on to an endless tape 7.

The tobacco on the tape 2 is passed down a smooth passage 16 formed by the tape 2 and a co-operating steel band 17, during which movement the tobacco delivered into the passage is rearranged and brought into comparative uniformity, as explained in U. S. application, Serial No. 86,628, filed April 11, 1949, now matured as Patent No. 2,671,452, issued March 9, 1954. The resulting filler is then delivered on to the paper web 3 at the position occupied by the small roller 6 and the tape 7 carries the loaded web through folders and other devices, indicated by the reference 8, where the paper is wrapped around the tobacco core to form a continuous cigarette rod marked 51. The edges of the paper are secured together by paste from a paster 9 whereafter the rod passes beneath a heater 10 which dries the paste after which the rod is severed into separate cigarettes by a cut-off 11. These cigarettes pass on to an endless travelling tape conveyor 12, which carries them to a deflector device 13 where the deflector blades move the cigarettes out of the rod line and deliver them to a catcher band 14.

The machine illustrated is one of a class previously referred to where the hopper tape runs faster than the paper web.

In order to vary the feed of tobacco to the belt 2 should the weights of the cigarettes produced deviate too much from the desired weight, there is provided a hopper driving shaft 15 whose speed is regulated in the example illustrated by manual rotation of a shaft 20. Movements of this shaft, which constitutes the speed regulating shaft for the hopper, vary the speed of shaft 15 and thus the feed of tobacco. On a shaft 242, see also Figure 4, which is coupled to the main driving shaft 237 of the machine in a manner described in detail later with reference to Figure 4, there is provided an expanding pulley device. This is marked 255 in Figure 4 and consists, as shown in Figure 1, of a fixed cone 22 and a movable cone 23 slidable on a spline on the shaft 242. Between the cones are a number of curved segments 24 which can slide in grooves in the cones as the latter move towards and away from one another and are held to the cones by spring rings 25. The movable cone 23 is moved by a screw 26, Figure 4, which moves in a fixed bush 26A the screw being rotated by a sprocket wheel 28 driven from the shaft 20 by a chain 29 and sprocket wheel 30. Suitable thrust rings 30A are provided and as the screw rotates one way the cone 23 is moved in towards the other, or in the reverse direction, the pull of belts 31 running on the parts 22, 23, 24 of the expanding pulley device 255 opens the cones. A jockey pulley 31A is provided to take up the slack in the belts and the latter pass over a large pulley 32 on the hopper driving shaft 15.

At a position beyond the hopper, the hopper tape 2 passes between a ray source contained in a box 111 and a ray detector or ionisation chamber contained in a casing 110 and, by suitable amplifying and other devices, the ionisation of the gas in the chamber by rays not absorbed by the mass of the tobacco and the tape passing the scanning position determine the movements of an actuator 222 described later with reference to Figure 4, which controls variable speed gearing, in a gear box 216, driving the tape 7 and paper web conveyors. This gearing is shown in Figure 4 and will be described presently. The mass of the tape is of course known and can be allowed for or the radiator and chamber are duplicated as shown, the duplicate set 165 and 166 acting as a balancing device, described in full detail later, having a given material mass positioned between the ray source and the chamber. This arrangement is also of benefit in the circuit arrangements between chambers and actuator to reduce the current in part of the circuit to the difference between the currents caused by the said chambers. The said mass has an absorption equal to that of a filler of the desired mass.

If the mass of tobacco in the hopper tape passing the radiator over a suitable period of time as explained more fully hereafter is above or below the desired mass, the gearing is altered to increase or reduce the speed of the conveyor 7. That is, the hopper tape speed remains constant and the speed of the paper web is changed in accordance with the actuator movements so that the paper web draws out or consolidates the tobacco delivered to it by the hopper tape in accordance with changes in the relative speeds. As, however, the change is not much in comparison with the normal difference between the speeds of tape and paper, this arrangement does not seriously affect the benefits normally derived from the differential speed arrangement.

Measuring effected by electrical methods or by radiation methods such as by beta rays is extremely rapid and the measuring apparatus responds instantly to a change of quantity but it is not desirable to subject the actuator to such rapid control. Further, the radiation from the source varies from instant to instant, i. e. during exceedingly short periods of time, though the total radiation is substantially constant for moderate periods such as ½ second. A curve showing the measuring apparatus response is a rapidly oscillating curve (wave). The apparatus therefore includes devices whereby a time constant, e. g. ½ second, is interposed between measurement and actuator movements whereby rapid oscillations are smoothed out and the actuator movements follow only a bodily drift of the curve.

The source of the rays may be a radio-active material such as thallium "204" or strontium "90." The ionisation chamber is in circuit across a source of D. C. voltage with a resistance of high value. The effect of the high speed electrons entering the chamber is to ionise the contained gas (air) and to cause a minute current to flow in the resistance. The value of this current is substantially proportional over the working range to the number and energy of the electrons entering the chamber and causing ionisation and this number, and hence the current, depends on the absorption taking place in the cigarette and this depends on the mass of the filler being scanned by the source. The current in the chamber is too small for direct practical use and it is amplified to a sufficient degree to operate a direct indicating meter 65, Figure 5, and a circuit to operate the actuator to alter the variable speed gearing and change the speed of the tape 7.

The present method (subject to certain reservations explained later) does not suffer from any difficulties due to moisture content, because as is known, the absorption of beta rays depends, for a constant section, entirely on the mass of material through which the rays are trying to pass, and in the case of tobacco with a certain moisture content, if the moisture content be increased, the mass of the rod will be increased, and the ionisation current will be decreased in proportion and an indication of the true weight will be obtained, which is as required.

Tobacco is of fibrous nature, unlike homogeneous material, and the packing of the fibres may vary a small amount along a formed rod or even a loose filler even though the true mass of the rod is substantially constant; because of this the measuring circuit is designed to have a time constant of approximately ½ second so that the reading of weight obtained is the average over this period.

A length of filler or rod of about 8" is scanned and for this purpose an ionisation chamber contained in a casing 110 is supported above the filler or rod and a ray source contained in a box 111 at the other side.

Referring now to Figures 2 and 3 which show the ionisation chamber and ray source in detail the chamber casing 110 has a wire mesh guard 114 over its open side. Inside the casing 110 is an inner casing 115 which constitutes the ionisation chamber and has a thin metal window 116 through which the rays can pass. The chamber also functions as one electrode of the device. The box 111 is similarly provided with a window 117 through which rays can pass. Inside the ionisation chamber 115 is an inner electrode 118. The chamber is hermetically sealed and contains air. Cables 119 and 120 connect the two electrodes to the electrical apparatus described later with reference to Figure 5.

A similar device is provided for use as a balancing device in the manner explained later.

Between the chamber casing 110 and the box 111 there is provided an extension of the casing 110 constituting a holder 122, hereafter called a screen holder. The screen holder has grooves in it at 123 in which a screen frame 124, comprising three screens 125, 126 and 127 respectively, Figure 2, can slide. The screen holder is broken away in Figure 2 to show these screens. The screen holder lies against the face of the chamber casing 110, as in Figure 2, so that the screens are facing the ray source. The screen frame is slid to and fro in the grooves of the holder by means of rods 128 at each side of the frame which are provided with rack teeth, as shown in Figure 2, and engage pinions 130 on a small shaft 131 journalled across the screen holder 122 and provided with a knob 129 by which it can be rotated. On the shaft 131 there is fixed a cam or detent device consisting of a cylinder 132 on which three flats 133 have been worked, each flat being a chord of the original circular section. These flats cooperate with stiff flat springs 134, fixed to the holder 122 so that as the knob 129 is rotated and the frame is slid to and fro by the pinions and racks, the cam 132—133 rotates and the engagement of the flat springs with the flats on the cam provides a detent which will hold the screen frame in a definite position when the knob 129 is released.

The screen frame comprises a series of apertures, for example, three, the middle one of which has a thin metal covering or screen 125 which is equivalent in absorption to the desired tobacco mass while the apertures to the right and left respectively of the middle one are provided with a thicker screen 126 and a thinner one 127 respectively. The thickness chosen depends on circumstances and the requirements of users, but conveniently the screen 126 offers the same resistance to the passage of rays as a tobacco rod 4% denser than normal would offer while the screen 127 offers a resistance of 4% less than the normal rod. These screens may be made of Duralumin. There is a fourth aperture 135 without a screen.

In use the apparatus is operated with the fourth aperture in line with the filler.

The chamber casing 110 is pivotally mounted at 146 so that it can be swung in the direction of the arrow, Figure 2, to bring its operative face vertical and facing upwards, and the consequence of such a movement is that the beta-ray source is emitting rays into the atmospheer and in a direction where they are likely to strike the operator. As a precaution against such an event there is provided a shield 147 which is slidable horizontally and operated so that in one position the source is exposed while in the other position the window of the source is closed by the shield. For this purpose there is provided at each pivot a pinion 148 fixed to the casing 110 and engaging a rack 149 fixed to the shield. As the casing 110 is swung on its pivot the pinion moves the rack to and fro so that as the chamber casing is opened, the pinions rotate and shift the racks so that the shield 147 moves along to cover the window 117 of the ray source. When the chamber casing 110 is again closed the shield is moved in the opposite direction. The chamber casing is held in the closed position by a clamp 151.

The movable screen holder and the shield form the subject of U. S. Patent No. 2,759,108 issued August 14, 1956 and no claim to these devices is made herein.

The ray source is adjustable towards and away from its ionisation chamber and for this purpose, see Figure 2, the box 111 has fixed thereto a bracket 152 whose rear comprises a thick plate 153 which is threaded to receive two rotatable screws 154. These screws are fixed to bevel gear wheels 155 which are rotated by other bevel gear wheels 156 fixed on a shaft 157 journalled in bearings 158. A hand knob 159 is fixed to the shaft 157 and when the knob is rotated the box 111 is moved to and fro. A pointer 160 fixed to the bracket 152 travels over a scale 161 and subdivisions of the scale measurement are afforded by a dial 162 marked into suitable divisions, against which moves a pointer 163 fixed to the knob.

For reasons given later in the description of the operation of the apparatus it is technically desirable to use a second source and chamber jointly constituting a "balancing device," with a metal screen interposed which has a ray absorption equivalent to that of the desired tobacco mass and to arrange this chamber electrically in opposition to the first chamber so that any current resulting from the measurement is the difference between the currents in each chamber.

In order that the output or current from the apparatus shall be a measure of the tobacco mass only, it is necessary that in all conditions of measurement any extraneous factors affecting the measuring device shall be applied to the balancing device so that the resulting current depends solely on the tobacco mass.

In Figure 1, where measurement is made while loose tobacco is conveyed on a tape, the rays pass through the tape. The absorption by the tape changes with use because the tape wears away, particularly at first, and the pores of the tape tend to become filled with dirt, particles of tobacco and possibly particles of the metal (steel) of the guides and other members which control the path and movement of the tape.

To offset the absorption by the tape and to meet any changes in its absorption due to wear the balancing device consisting of ray chamber 165 and ionisation chamber 166 is positioned to scan the tape at the place shown in Figure 1, where the tape does not carry tobacco.

The movable screen holder above described is used with the measuring device and an identical screen holder is provided for the balancing device. In other words, the measuring and balancing devices are identical in all respects save that the balancing device is so adjusted that in place of the tobacco passing through the measuring device a metal screen, the screen 125, Figure 2, whose ray absorption is equivalent to that of the desired tobacco mass, is used in the balancing device.

As a measure of economy in manufacture the measuring chamber need not have the ray position adjustment so long as the balancing chamber is adjustable.

Where a flat tape is scanned a scraping device may be employed on the return run of the tape 2 so that when it enters the balancing device at the right of Figure 1, the tape is clean and free from dust or other foreign bodies which would interfere with the accuracy of the balancing device. The scraping device is shown in Figure 1 and consists merely of a box 200 containing scrapers 201 and an outlet 202 leading to an exhaust system. As a further safeguard against inaccuracy due to dust the measuring and balancing device may be provided with blowers 203, shown in diagrammatic form at Figure 4, which blow a jet of air across the face of each ray box and remove any dust therefrom. These blowers are shown in Figure 4 as a matter of convenience as an air pump 252 is driven from the gearing shown in that figure.

The operation of the apparatus so far described will now be explained with reference to Figures 5 and 4 during which description other parts will be referred to.

The window in the casing 110 is positioned opposite the ratio-active source in the box 111 so that the rays that penetrate the filler pass into the chamber. A source of D. C. voltage, e. g. a battery 58 is applied between the inner and outer electrodes 118 and 115. The beta particles that enter the chamber 115 cause ionisation of the gas (air) in the presence of the applied potential and the resultant current, which is a measure of the energy of the rays penetrating the tobacco, develops a voltage, across a high value resistance 60. This voltage must be amplified before it can be put to practical use, and because it is essentially a direct current, a form of D. C. amplifier is necessary.

It has been found most satisfactory to use a vibrating condenser electrometer 61 in which the input D. C. potential is first converted to A. C. by applying it through a resistance 62 to a condenser 63 the capacity of which changes at a suitable frequency (500 cycles). An A. C. voltage proportional to the D. C. input is developed across this condenser, which is passed into a conventional A. C. amplifier 64 and subsequently rectified to produce a D. C. voltage proportional to and in phase with the deviation from the desired weight.

This output voltage, in addition to energising a direct reading meter 65 causes a correcting circuit to operate and control the speed of conveyor driving mechanism.

The value of the resistance 60 referred to earlier across which the voltage is developed is of the order $10^{10}$ to $11^{11}$ ohms. It is found that resistances with a high value like this are rather unstable, that is, the voltage developed across the resistance changes slightly with time. Because of this it has been found desirable to use the additional radio-active source 165 and an ionisation chamber 166, Figure 1, see also Figure 5, to form a balancing device, which, for the desired mass of filler or rod is arranged to pass a current equal and opposite to that from the chamber in the casing 110, measuring the filler or rod. The high resistance 60 then only conducts the difference in the two currents and, at balance, small fluctuations in the value of this resistance are unimportant.

From the A. C. amplifier 64 current passes to a phase-sensitive rectifier 67 which works in synchronism with a maintaining circuit 68 for the vibrating condenser; by this means the output voltage developed at a point 0 across a cathode follower load resistance 69 which receives current from a cathode follower 70, which point is normally at the same potential as the earth line, will change to a positive value or a negative value dependent on whether the output from the measuring chamber relative to that from the balancing chamber is greater or less; in addition provision is made for a controllable portion of this voltage to be fed back along line 66 to the input to stabilise the amplifier against internal variation and to allow adjustment of overall sensitivity.

The indicating meter 65 is connected in series with a variable resistance 71 (to adjust the sensitivity of the meter) between the cathodes of two tubes 72 and 73, the whole arrangement forming a balanced tube voltmeter. The circuits of these tubes are arranged by adjusting a resistance 76 so that with the point 0 at earth potential the two cathodes are at the same potential and there is no current in the centre-zero meter 65. The circuits of the phase-sensitive rectifier 67 and cathode follower 70 are also arranged so that when the output from the measuring chamber in casing 110 is the same as that from the balancing chamber 166 the point 0 is at earth potential.

As a result, when the meter 65 is in the zero position the mass of the filler is at the desired value and when this value varies, the indication on the meter will follow the change, a change of 5% in weight from the desired value of the filler or rod causing full scale deflection, when the variable resistance 71 of the meter is set for maximum sensitivity. This range of 5% is rather narrower than is required in practice and the apparatus can be adjusted up to a full scale deflection equal to 8% change in weight.

Before continuing the description of Figure 5, which description has so far dealt with the measurement of the mass of the filler and an output voltage of "signal" derived therefrom, a short outline of the purpose of the remainder of Figure 5 and the associated mechanism of Figure 4 will be given.

The object is to give an accurate and rapid change in the speed of the paper conveyor system relatively to the hopper output when this output changes in value from that necessary to give a filler of the desired mass. The speed change may be either an increase or decrease and it must at all times be in exact proportion to the deviation in the mass of the filler from the desired mass. Briefly, the output signal from the part of the circuit, Figure 5, so far described, is amplified in an amplifier shown in the lower part of the figure and applied to a moving coil 87, see also Figure 13, which positions a sensitive valve 260 of a hydraulic variable speed unit 222 coupled to the conveyor driving mechanism through a differential gear contained in a gear box 216, Figures 1 and 4 and comprising sunwheels 229 and 231 and planet wheels 218, all described in detail later with reference to Figure 4, said gear being so arranged that the hydraulic unit increases or decreases the speed of the differential gear and thus of said mechanism according to the direction of rotation of the hydraulic motor of the variable speed unit. The hydraulic motor also drives a tacho-generator 250, the output voltage of which is introduced into the circuit between the output from the measuring apparatus and the amplifier referred to which is described in the next paragraph. This voltage which is in opposition to that of the output and may be termed an opposing "signal" or "negative feed-back" linearises the output speed of the variable speed unit and greatly increases the frequency response. With this system of control the output meter 65 indicates at all times variations in the supply from the hopper and is not influenced by the operation of the variable speed unit. Because of this another meter 93, shown in the lower part of Figure 5 and later termed a weightmeter, is inclined in the circuit which is so arranged that while the speed of the conveyor driving mechanism is being altered this meter, which is of the centre-zero type remains at zero or "correct" position. Should the conveyor speed fail to change in sympathy with the input signal the weight-meter will indicate the error in the cigarettes being produced.

The apparatus so far described with reference to the upper part of Figure 5 constitutes what is in effect a gauge while the lower part of the view shows apparatus for controlling the speed of part of the machine. The connections between gauge and speed controller will now be described.

The output of the gauge is taken from point 0 and the earth line which, as explained above, also feed the meter 65. Neglecting for the present the device marked 250, which is a tacho-generator, and the resistor 91 and the circuit of a meter marked 93, the input is fed to the grid of a triode 77, through a resistor 78, a variable resistance 79, and a grid stopper 80. Triode 77 in conjunction with a triode 81 (in the same glass envelope) form together a voltage amplifier of high stability, low output resistance, and they give an amplification of half that of the amplification factor of the individual tubes. The amplified voltages is extracted at the anode of tube 77. Because the mean D. C. voltage at this point is 100 volts the resistance-potentiometer network 82, 83, 84 in conjunction with the 200 volt negative stabilised supply is used to obtain a point nearly at earth potential for feeding the two output tubes 85 and 86. These tubes are connected in parallel as triodes in cathode-follower fashion to provide a low output resistance for a moving coil element 87. The lower end of this moving coil element is connected to the earth line and the upper end to the paralleled cathodes of the tubes 85 and 86. A switch 88 is provided so that coil 87 can be cut out of the circuit when the machine is first started because at first the hopper is liable to deliver irregularly for a short time and the coil 87 is brought into use when making is proceeding satisfactorily. The paralleled cathodes are also joined through the resistor 89 to the —200 volt supply. With these connections when the grid voltage of tubes 85 and 86 is slightly negative, actually about —2 volts, the upper end of the moving coil element 87 is at earth potential and consequently there is no current passing through the coil. In practice, as explained previously, the output from the gauge is at earth potential when the density of tobacco is as desired and potentiometer 83 is initially adjusted so that no current flows in the coil 87 under this condiiton. At other times a current flows in the circuit of the coil 87 for a very small input voltage from the gauge, the direction of this current depending on the polarity of the input voltage from the gauge.

The device marked 222 is a variable speed hydraulic unit (known as an oil unit since the working fluid is oil) described later with reference to Figure 19 and comprising a high pressure oil pump with a relief valve and a sensitive valve 260, Figure 13, controlling the direction of rotation and speed of the output shaft of an oil motor of about 1/3 H. P., the speed being approximately proportional to the displacement of the sensitive valve. The sensitive valve 260 is coupled direct to the moving coil element 87, shown best in Figure 13, which, having a permanent magnetic field 261 and being provided with a centre-stable spring diaphragm 262 experiences a force proportional to and in a direction depending on the current. The mechanical coupling between the moving coil element and the sensitive valve is positioned so that when the input from the gauge is at earth potential the oil motor is at rest. At other times the output shaft of the oil motor will rotate in a direction depending on the input voltage.

The oil motor itself is mechanically coupled to a differential gear box described in detail with reference to Figure 4, and arranged to increase the speed of part of the conveyor system of the machine when the density of the tobacco from the hopper increases above the required amount, and to reduce the speed of this part of the machine when the density is too low. Hence the weight of the finished cigarettes is kept at approximately constant weight in spite of variations in the output of the machine hopper. In practice, because in one direction of rotation of the oil motor it has to increase the speed of the said part of the machine, and in the other direction it experiences a reaction from the machine, that is, the part of the machine tends to drive the oil motor, there is a tendency to a greater speed in one direction than the other for equal but opposite input voltages. For this reason, and also to increase the "stiffness" of the system, that is, improve the frequency response, the tachogenerator 250 is mechanically coupled to the output shaft of the oil motor through step-up gearing, see Figure 4, and this generator provides a voltage exactly and at all times proportional to the output speed. The generator output has one lead connected to the upper end of a resistance 90 while the other lead is connected through a resistance 91 and potentiometer 92 and returned through a variable resistance 79 and a fixed resistance 78. The voltage developed across resistances 78 and 79 is applied to the grid of tube 77. The polarity of this voltage developed across resistances 78 and 79 which is in series with the input voltage, opposes and reduces the effectiveness of the input voltage, but at the same time the performance of the whole is enormously improved and for all practical purposes the output speed of the oil motor becomes exactly proportional to the input voltage from the gauge being unaffected by variations in load or change of direction.

Although the effectiveness of the input voltage in producing a current in the moving coil element 87 is reduced by the series voltage produced by the tacho-generator feed-back, the amplification of tubes 77 and 81 and the winding of the element 87 are chosen so that without feed-back a small fraction of the normal maximum input voltage gives full speed rotation in either direction.

In practice the ratio of the gearing between the oil-motor shaft and the input and output shafts of the differential gear box is chosen so that when the motor is running at full speed in either direction the speed of said part of the machine is increased or decreased by not more than 10%, the exact amount of speed variation being controlled by the variable resistance 79 which alters the amount of voltage in opposition to the input voltage at any given speed.

When the oil motor is at rest, the speed of the machine is in step with the hopper output and this avoids difficulties of other systems when the machine is being started and stopped. Further because the speed of the part of the machine whose speed is changed as conveyor speed alters (that is, all parts of the machine other than the tobacco feeding mechanism) is never changed by more than 10% for full input voltage, an error in linearity of the mechanism is reduced by a factor of 10, and, neglecting losses in the differential gearing and the power for acceleration, the horse power required in effecting said speed change is one-tenth of that required to drive the whole cigarette making machine. All these factors together with the stable and linear amplifier and the voltage feed-back contribute to a system proved in practice to give a speed variation exactly in step with the input signal and capable of following, without noticeable lag, rapid excursions of the input signal.

With this system, variations in the density of the hopper output are indicated on the output meter 65, but this indication is unaffected by the alteration in the speed of part of the machine by the device just described. In practice it has been found desirable to have some indication that the circuits are functioning satisfactorily, so that the operator is sure that the final product is of the correct weight.

This indication is provided by a meter marked 93 which is a centre-zero micro-ammeter suitably calibrated to indicate weight and may thus be termed a weight-meter. This meter is effectively connected across resistors 78, 79 and 92, the connection to the meter then being from potentiometer 92 in series with a resistor 94 to the earth line and back through resistor 90, resistor 94 being of high value.

In normal operation the voltage developed across resistors 78 and 79 by the tacho-generator is in opposition to the input voltage developed across resistor 90 but the circuit and speed adjusts it so that it never quite equals the input voltage. The potentiometer 92 however, allows an additional voltage so that at all times when the output speed of the oil motor is proportional to and in opposition to the input voltage, the voltage applied to the weightmeter is zero and the meter does not deflect. Should the oil-motor fail to respond to an input signal there is no opposing voltage from the tacho-generator and the weightmeter with suitably chosen circuit values indicates an error in step with the output meter 65. Similarly should the speed variation not be the correct amount or should it lag behind the input signal the weightmeter will indicate the error in the weight of the final product.

The driving arrangements of the machine are shown in more detail in Figure 4. Referring now to Figure 4, 210 is a motor which drives the whole of the cigarette machine. Belts 212 from the motor pulley 213 drive a pulley 214 fixed to a shaft 215 in a gear box 216. On the shaft 215 is fixed a planet carrier 217 on which planet bevel gear wheels 218 are rotatably mounted. The other end of shaft 215 has a sprocket wheel 219 fixed to it and this drives another sprocket wheel 220 by a chain 221. The wheel 220 is fixed to a shaft journalled in a box 222 which contains the oil unit previously mentioned and consisting of pumps which drive oil under pressure through an oil motor. The oil motor drives a sprocket wheel 223 which is coupled by a chain 224 to another sprocket wheel 225 fixed to a shaft 226 journalled in the gear box 216. A spur gear wheel 227 fixed on the shaft 226 drives another spur gear wheel 228 fixed to a sun bevel gear wheel 229 meshing with the planets 218. Any movements in either direction of the shaft 226, due to movements of the oil motor, will rotate the sun gear wheel 229 on the shaft 215 a proportional amount and cause the planets to rotate on their axles 230 and this movement will cause the other sun gear wheel 231 to rotate relatively to the shaft 215. A spur gear wheel 232 is fixed to the sun gear wheel 231 and shares its movements. These are communicated to a double-sprocket wheel 233 through a spur gear wheel 234 and the wheel 233 drives another double-sprocket wheel 235 through chains 236. The wheel 235 is fixed to a shaft 237 which forms the main driving shaft of the cigarette machine bed and drives the printer 5 and all parts to the left of the small roller 6, Figure 1. The cut-off is driven from this shaft in the following manner. A spur gear wheel 290 on shaft 237 drives another spur gear wheel 292 on a shaft 293 through an idler gear wheel 291. On the shaft 293 is a spiral gear wheel 294 meshing with another spiral gear wheel 295 which drives a further spiral gear wheel 296 fixed to the shaft 297 of the cut-off 11. A sleeve 238 is rotatably mounted on the main shaft 237 and has a spur gear wheel 239 at one end which is driven through an idler 240 from a spur gear wheel 241 fixed on a shaft 242. At one end of the shaft 242 is the adjustable pulley previously described which drives the hopper and is marked collectively in this view by the reference 255. The other end of shaft 242 has a spur gear wheel 243 on it which engages with another spur gear wheel 244 fixed on the shaft 215.

The sleeve 238 has fixed thereto a worm 245 which drives a wormwheel 246 to whose shaft 247 is fixed a drum 254, see Figure 1, which drives the hopper tape 2.

Thus in operation the sleeve 238 is driven from the motor 210 through an unvarying gear train and the hopper tape 2 moves at a constant speed. Also the adjustable pulley 255 which drives the hopper is driven at a constant speed, though the hopper itself may have its speed altered by adjustment of the pulley as described. The main shaft 237 is however driven through a gear train whose effective ratios can be altered while running, for while the shaft 226 is still, the sun gear 229 will stay still and the planets 218 in addition to their orbital movement will rotate on their axles and rotate the other sun gear 232 accordingly. If the oil motor shifts the shaft 226 either way the sun gear 229 will rotate relatively to the shaft 215 and add an additional movement (positive or negative) to the rotational movement of the planets and the speed of the sun gear 231 will alter accordingly. In this way the speed of the mainshaft 237 and all the parts driven thereby will change as directed by oil motor movements.

These oil motors, which are known contrivances, have a very quick response and their movements are controlled by a small valve which throttles the oil supply from the pumps, this valve being operated by the magnetic coil 87 of Figure 5 which is enclosed in a casing 257.

Referring to Figure 13, the moving coil element 87 is connected to a rod 263 at the end of which is the sensitive valve 260, formed as a piston valve working in a sleeve 265 having three ports. This sleeve vibrates in a valve body 264 also having three ports 264A, 264B and 264C, the outer ones 264B and 264C leading to cylinders 266 with pistons 267. Oil supplied through a pipe 281 to the middle port 264A can go into either of the outer ports depending on the position of the sensitive valve, and the corresponding piston 267 is moved outward. The sleeve 265 is called a "ditherer" and it is oscillated or vibrated by an eccentric rod 282, Figure 19, so as to ensure that at all times the ports are freely lubricated, for if the sensitive valve remained in one position for a long time, it might not move quite freely under the impulse of the magnet and it is important that this valve should follow magnetic movements without hesitation. Adjustment of the dithering movement from rod 282 is by a screw 283. The pistons 267 operate pivoted levers 269 which press on the main valve 270 and determine its position in the main valve body 268. The main valve body 268 has three outlets, 268A, 268B and 268C, the outer ones 268B and 268C leading to the oil motor 276, Figure 19, and the middle one 168A receiving oil from the oil pump 273, as will be explained with refererdence to Figure 19.

The oil unit shown in Figure 19 consists of an oil pump 273 which is driven, as shown in Figure 4, by the electric motor 210 through the pulleys 213 and 214, which are coupled by the belts 212 and drive the shaft 215. The shaft 215 drives the oil unit by a chain 221 connecting the sprockets 219 and 220, the latter being coupled to the oil pump shaft 274, Figure 19. Thus the oil unit pump is running all the time the machine is working and continuously pumps oil through a pipe 275 to the main valve body 268 previously described with reference to Figure 13, from which oil to the oil motor 276 is fed through pipes 277. One pipe is the feed and one the exhaust, according to the position of the main valve 270. Oil coming back through the exhaust pipe drops out of the valve body 268 into a sump (not shown) formed in the casing of the unit and oil from the sump is sucked up by the oil pump 273 through a pipe 284. The main valve has its position controlled by the magnet coil 87, as previously described with reference to Figure 13, and consequently the movements of the oil motor 276 depend entirely on the position of the sensitive valve 260 which is controlled by the magnet coil 87. An adjustment is provided at 278 for the pressure of the oil in the system by regulation of a pressure controller 279 which receives oil from a by-pass 280 from the main oil supply pipe 275.

This oil unit is a known contrivance and has been largely used for the control of gunnery, particularly for anti-aircraft guns, and it has the virtue that the oil motor movements correspond very accurately indeed with the position of the sensitive valve 260, and that there is no appreciable lag in the whole system. The oil motor 276 moves the differential sun wheel 229 shown in Figure 4 and previously described and it will thus be apparent that the speed at which the paper conveyor system is driven depends on the output from the beta-ray measuring device shown in Figure 5 and changes with alterations in said output.

The shaft 226 has a large gear wheel 248 at one end which drives a smaller one 249 to which is coupled the tacho-generator 250. This provides current for feedback, as described with reference to Figure 5.

On the motor pulley 213 is a sprocket wheel 251 which drives a fan or air pump shown diagrammatically at 252 and its outlet provides pressure air through two pipes 253. At the other ends the pipes are connected to the nozzles 203 which blow air across the faces of the ray boxes. These air currents blow away dust and tobacco fragments which are bound to accumulate at these places and would otherwise give rise to false measurements.

The arrangement that has just been described is a very satisfactory one and has been proved by prolonged tests. It may be taken as a general rule that measurement should be followed as soon as possible by the change in the conveyor speed. That is, there should be no unavoidable lag or dead time between the two events.

In Figure 6, which will now be described, the measuring device is nearer to the conveyor than in Figure 1. The figure shows a modification in the arrangement of the chambers shown in Figure 1. Between the smooth passage 16 which is positioned nearer to the hopper 1 and the tape 7, there is a paper support marked 53. This may be a strip of very thin metal such as duralumin or aluminium foil stretched over brackets 54 and anchored at 55.

The circuit of the measuring device in this case may be the same as that described with reference to Figure 5 but it is possible that it will be necessary to provide, at least partially, the proportional, rate of change, and integral control arrangements which are described in the U. S. application by Powell, Serial No. 303,636, filed August 11, 1952.

Since the measurement is being effected on the conveyor, that is, the web 3, and its speed is to be altered, the arrangement forms a closed loop system where the controlled output is continuously compared with the desired mass and such an arrangement is liable to oscillate or hunt. Application of the above mentioned three control arrangements to the device, with suitable adjustments, may be made to check this tendency.

Figure 7:
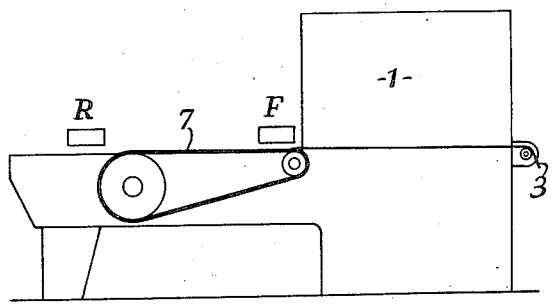
Figures 7 to 9 are diagrams of several conveyor arrangements in cigarette machines.

It is conceivable, however, that users may wish to equip a machine with devices according to the invention where it is not possible, for structural reasons, to put the measuring devices in such favourable positions, as in Figures 1 and 6. Further, although it is best to perform the measurement while a filler is on a flat tape, some machines collect the filler on a U-shaped tape and considerable alterations would be necessary to reconstruct them for a flat tape arrangement. It is therefore desirable to show how the invention can be adapted in such circumstances and reference is now directed to Figures 7 to 10. Figure 7 shows a machine which is in very large use. The paper web 3 runs beneath the hopper 1 so that the shower is collected directly on the paper, which is sometimes bent to a U shape and sometimes flat with metal side guides. In this case it is only possible to alter the speed of the whole conveyor arrangement. The measuring is effected at F at a position beyond the hopper, but as near as possible thereto to reduce the delay in correction to a minimum.

Figure 8:
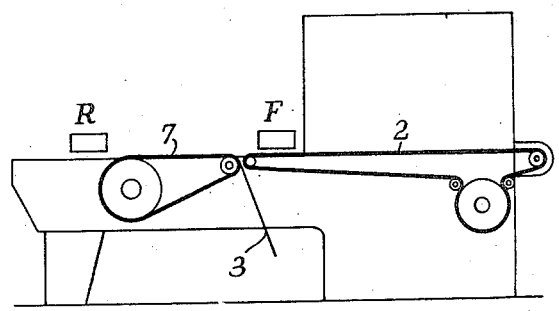

Figure 8 shows another kind of largely used machine where the shower is collected on the tape 2 which in this case is bent to U-shape though it is sometimes run flat. The choice of flat or U-shape is determined by considerations of compacting, distribution and compression which factors are determined by considerations outside the present invention. Thus in both Figures 7 and 8 alteration in conveyor speed causes the falling shower in the hopper to be delivered to a greater or less running length of conveyor (paper web or hopper tape) which thus becomes loaded with filler in proportion. In Figure 8 there is usually an existing difference in speed between the tape 2 and web 3, the tape running faster, but the speed change resulting from measurement can be applied to both items so their relative speeds remain unchanged and the normal benefits of the differential speed arrangements will still accrue, or the speed of tape 2 alone may be changed in response to the measuring operations, with the object of improving the effect obtained by the use of a speed differential.

Figure 9:
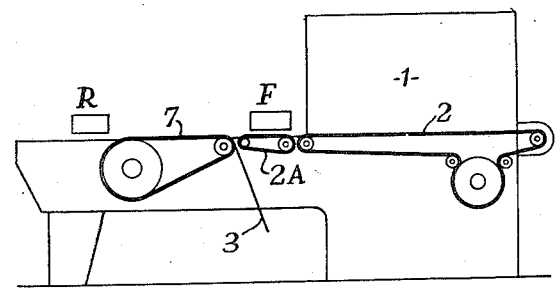
Figure 10:
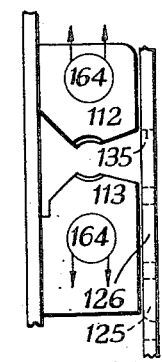
Figure 10 shows a guide for a wrapped cigarette rod for use when a rod is measured instead of a filler.

In Figure 9 there is an intermediate tape marked 2A, used sometimes for causing special compacting of the filler. Measuring may be effected at F and the speed of conveyor 7 altered.

It is also conceivable that circumstances may arise where it is desired to measure the wrapped rod and for this practice the measuring device is positioned at R just before the finished rod is cut into cigarettes. In such a case the rod is guided between chamber and ray source by guides 112 and 113, Figure 10. Owing to the fact that the wrapper of the rod has just been pasted and sealed, condensation is likely to occur so these guides are provided with heaters 164 which are thermostatically controlled. The guides 112 and 113 are so shaped that only the centre part of the rod is scanned, to avoid any errors which might occur if the whole rod were scanned as the rod is liable to move up and down slightly. By this arrangement there is as small a change as possible in the length of tobacco through which the rays pass.

The details of the balancing device including the dust blowing devices, the location of the device relatively to the tape and the tape scraper form the subject of U. S. application, Serial No. 320,281, filed November 13, 1952, and no claim is made herein to them and they are described only as part of the best way of carrying out the present invention.

There are then many factors to take into consideration when considering the location of the measuring device and the following text is given as a guide.

When a loose filler is being measured, as it must be supported on a tape, this tape may be of U section to convey and guide the tobacco or, if a flat tape is used, as in Figures 1 and 2, guides must be provided for the sides of the filler. In either case the mass of the side guiding devices is known and can be accounted for or balanced when the rays are arranged to pass through guides and tobacco.

Any extraneous material such as the tapes or guides referred to, which intercepts the rays is undesirable and in order to reduce this material to the minimum the ray source and chamber are preferably disposed above and below the tape, as explained above. This enables a flat tape to be used so that only a single thickness thereof intercepts the rays and the bulk of the influence is available for tobacco detection. The tape could be a shallow concave curve on its upper surface, without material difference, so as to control the filler laterally without side guides and in all cases the arrangement is best in which the minimum amount and thickness of extraneous material is allowed to intercept the rays. In cases where the disposition of source and chamber are such that side guides are necessary but the rays do not pass through the guides before and after passing through the tobacco, such guides, see 52, Figure 2, should be thick enough (i. e. deep enough) to absorb all rays meeting them so that the rays passing to the chamber are only those which have passed through the tobacco.

In Figures 7 to 9 measurement is made of a loose filler at F while at R a wrapped rod is measured. If the tape happens to be a U shape, see Figure 11, the sides of the tape are practically parallel to the rays while in the case of Figures 1 and 2 only the thickness of the tape has to be traversed.

In Figure 11 the U shaped tape 2 is guided by guides 109 which are made thick for the purpose of absorbing any rays reaching them. If the tape is slightly curved with a concave upper surface, as it actually is just beyond position F, the side guides can be dispensed with, that is, as soon as the tape is curved enough to carry the filler without any spilling over the sides, other guides are not necessary.

Figure 14:
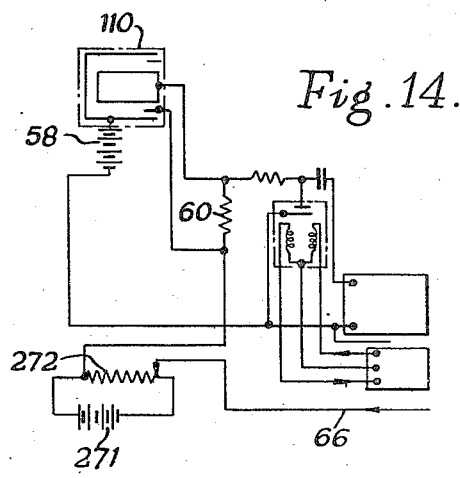
Figure 14 is a fragment of Figure 5 showing a modification.
Figure 16:
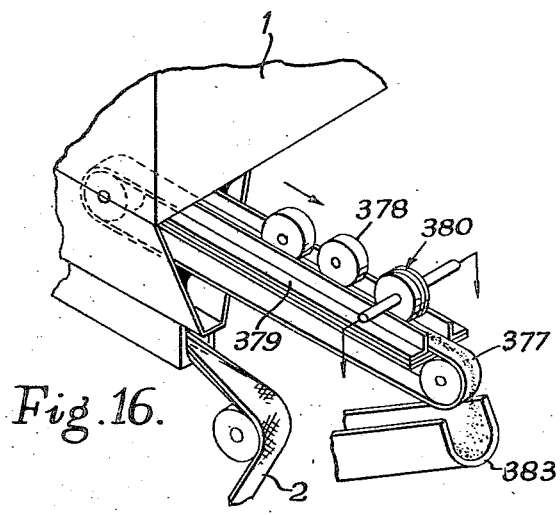
Figure 16 shows mechanical devices required when the circuit of Figure 15 is used.

Referring to Figure 14, when only a single ionisation chamber is used the battery 58 is connected in series with the high value resistance 60. As in this case there is no balancing device the voltage across resistor 60 can be offset by inserting in the feed-back line 66 a battery 271 with a variable potentiometer 272 to produce a counter voltage equivalent to that developed across resistance 60 when the tobacco being measured is of the desired mass.

It has been previously remarked that the present method does not suffer from difficulties due to moisture content but it may nevertheless be desirable to incorporate modifications to take moisture into consideration, as the users will, as a rule, desire that the final product shall weigh a certain amount at a given percentage moisture content which may not be that at which the tobacco has been manipulated. The invention may therefore include a device for measuring the moisture content of the tobacco being worked and recording it and regulating the above described apparatus accordingly. Any suitable known device may be used to determine moisture content, for example, by measuring the resistance of a predetermined mass of tobacco positioned between electrodes from which suitable regulation may be injected into the circuit of the apparatus at a suitable position.

Suitable apparatus for this purpose will now be described with reference to Figures 15 to 18. A continuous flow of tobacco is extracted from the hopper in a narrow stream, say ½" wide. This is taken out after initial operations have been performed on the tobacco and near to the main carded drum. The arrangement is shown diagrammatically in Figure 16 where the lower right-hand corner of the hopper 1 of Figure 1 is shown. A few inches of the shower which would otherwise fall on the tape 2 are intercepted by an upper tape 377 travelling in the direction of the arrow. The tobacco is formed into a lightly packed cheese of predetermined section and substantially constant mass, for example, by rollers 378 while being conveyed along on top of the upper tape, which is supported on and between insulated guides 379, and then passes under a roller 380 sprung downward, as indicated by the two arrows, with constant heavy pressure. This roller, see Figures 17 and 18, is an assembly of thin metal discs 381 each 1/16" wide with insulated spacers 382 about 1/8" wide the metal discs being arranged to form electrodes between which the conductance of the tobacco is measured. The connections to the discs 381 are taken through the shaft of the roller, one at each end. With the construction shown the electrodes form three parallel paths for the measurement.

Referring now also to Figure 15, the electrodes are arranged in a bridge circuit and the conductance is continuously compared with a previously predetermined value and any deviation from this value causes a mechanism to inject a voltage of correct polarity and magnitude into the measuring circuit of Figure 5 to compensate. A fragment of the measuring circuit is shown in Figure 15. The tobacco that has been used for this measurement is showered back into the hopper in any suitable way to mix with the main feed and is very shortly afterward delivered onto the tape to form part of the filler. As shown, the tobacco used for moisture determination drops into a chute 383 leading to the shorts conveying devices (not shown) which are generally fitted on such a machine and are conveyed thereby back onto the tobacco mass in the hopper. In Figure 15, two triodes 384 and 385 are provided, each connected as a cathode follower and having equal cathode loads 386 and 387 comprising differentially wound halves of a polarized relay 388. In the grid circuit of tube 384 a resistance 389 is in series with the electrodes 381 of wheel 380 across the plate voltage supply to said tube. From the junction of 389 and 381 a resistance 391 leads to a condenser 392 and to the grid of tube 384. It will be appreciated that the voltage at the junction of 389 and 381 will vary in accordance with the conductance across the electrodes but it will also tend to fluctuate due to uneven packing of the tobacco passing under the electrode roller. The resistance 391 and condenser 392 form a time constant for smoothing this fluctuation and hence the voltage at the grid of 384 varies only because of the change in conductance caused by a change in the moisture content of the tobacco.

The triode 385 has resistances 393, 394 and 395 in series across the plate voltage supply to said tube and the junction of 393 and 394 is connected to the grid of the tube 385. Resistances 389 and 393 are equal in value, while resistance 394, which is adjustable, is made variable to cover a range equal to the reciprocal of the highest and lowest conductances of the tobacco, with extremes of moisture passing under the electrodes.

The polarized relay 388 operates a contact tongue 396 center biased between contacts connected to solenoids 397 and 398 whose plungers are arranged as ratchet operating mechanism. A control shaft 399 has ratchet wheels 410 thereon and these are operated as explained below by the solenoid plungers. The shaft is coupled to the variable resistance 394 by a chain 411 and to two insulated contact arms 412 of a double potentiometer 413 to be described later.

When the arm of the resistance 394 is positioned so that the grids of tubes 384 and 385 are at the same potential, the currents through coils 386 and 387 are equal and they neutralize the attraction on the relay tongue 396 and the circuit to both solenoids 397 and 398 is open. When, however, the moisture content changes, the voltage at the grid of tube 384 no longer remains the same as at the grid of tube 385 and the relay tongue 396 moves across, energizing solenoid 397 or 398, as the case may be, and causing the ratchet mechanism to turn the shaft 399 in the appropriate direction, which movement alters the value of resistance 394 until the balance is again restored.

The mechanism and circuit so far described results in the shaft 399 taking up a previously determined position for every value of moisture content, and this angular movement of the shaft is used to position a pointer 405 on a scale 406 so that the value can be observed, and to move the two insulated arms 412 over the double potentiometer 413.

It is found in practice that the variation of the conductance with moisture across the electrodes 381 above and below the standard value is not linear and in order that the rotation of shaft 399 with variation in moisture shall be linear, resistance 394 is wound with a specially graded winding. The arms 412 and the windings of potentiometer 413 are arranged and connected and the arms are positioned on shaft 399 so that at the "standard" moisture content each arm is in the center of a potentiometer winding and no voltage difference exists. Following rotation in a clockwise direction due to an increase in moisture content a positive potential exists between the upper and lower arms, while should the moisture become less than the standard value, the shaft 399 rotates the other way and a negative potential then exists between the upper and lower arms. This voltage developed between these arms is inserted in series with the resistor 60 (Figure 5) at the lower end and this voltage modifies the input to the vibrating reed electrometer 61 and control elements so that if for example the moisture content is greater than standard when the output meter 65 reads correct weight, and the machine settles down, the actual weight produced will be sufficiently heavier to allow for subsequent conditioning of the excess moisture and vice versa.

The position chosen for the detection of the moisture content is such that rapid changes are not met as the tobacco is well mixed and teased before it reaches the detector.

It will be appreciated that any of the devices so far described act in the manner of a predictor in that they measure a quantity of tobacco and endeavour to set the machine right in a manner determined by the trend of the machine at the time of measuring. But the measurement can also be utilised in addition to cause correction to be made to the measured quantity. The beta ray device provides a record of the actual distribution of the tobacco on the hopper tape and this may be used as known forward information for the purpose of smoothing out inequalities existing on the tape, at a later stage.

With devices according to this invention, changes in the rate at which tobacco is fed to the conveyor system, e. g. the showering rate, are speedily appreciated and taken care of and under most operating conditions the provision of means for altering the speed of the conveyor system or of a part thereof is sufficient. But the normal hopper speed control can be retained and coupled to some suitable measuring device arranged to operate when the quantity being measured fluctuates beyond a certain tolerance cared for by the conveyor speed control devices. A suitable system for this purpose would be to use the device described with reference to Figures 4 and 5 in the said U. S. application of Powell, Serial No. 303,636, so as to alter the speed of the hopper control shaft all as described in said specification, and having a long time constant.

As the length of a cigarette is determined by the speed of the conveyor which carries the wrapped rod to the cut-off and the rate at which the cut-off revolves it will be understood that where said conveyor has its speed changed, corresponding changes will be made in the cut-off speed and similarly for other units of the machine (such as the printer, deflectors and catcher) affected by changes in paper web speed.

Figure 12:
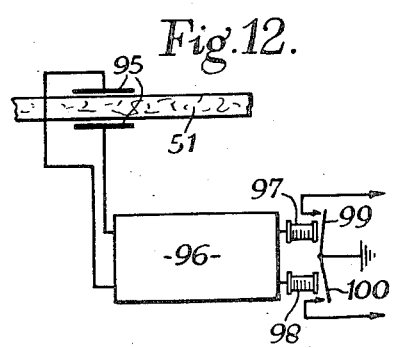
Figure 12 is a diagram illustrating the application of a known kind of electronic control to the invention.

While the specification has dealt largely with measuring by a radio-active source of penetrative radiation, any known measuring device may be used. A well known device of this kind is shown diagrammatically at Figure 12. The cigarette rod 51 (or a loose filler if necessary) passes between an electrostatic device comprising plates 95, the device being responsive to variations in the quantity of tobacco passing. By means of detecting and amplifying apparatus 96, magnets 97 or 98 respectively are energised as the quantity of tobacco varies. Switches 99 and 100 are operated by the magnets and the closing of a switch may be used to alter a variable speed gear, like that described for driving the hopper in Figure 1, by means of actuators such as those disclosed in Figure 12B or (preferably) 12A in the previously mentioned U. S. Serial No. 303,636. In this case, of course, the variable speed gear drives that part of the conveyor system whose speed it is desired to alter.

In cut tobacco as supplied to these machines, the moisture present in any mass is a relatively small percentage of the total mass, about 15% being a reasonable proportion. Thus the tobacco present is a major contributor to the total mass while moisture is a minor contributor. It should be understood that the moisture measuring devices measure the quantity only approximately since the accurate determination of moisture is a lengthy operation by weighing and evaporation. Further, the quantity of tobacco detected in a given mass may be the approximate average of measurement over a suitable time. It will be seen that in all the constructions described the tobacco after showering is carried along as a "filler" of a cross-section comparable with that of the finished cigarette rod, which latter is also included in the term "filler." The various tapes or the like conveying this filler jointly constitute "tobacco-forwarding means" while each of them is a "conveyor-device." The paper web itself frequently functions as a conveyor device though it is driven and its speed changes are effected by an endless belt or tape forming the conveyor device proper.

What we claim as our invention and desire to secure by Letters Patent is:

1. Mechanism wherein a moving stream of moist tobacco, having a greater proportion of tobacco than of moisture, is subjected to measuring operations, said mechanism comprising detecting means which is responsive to total mass of tobacco and moisture in the stream, tobacco being the major contributor and moisture the minor contributor to the response in said detecting means, and comprising further detecting means to whose response moisture in the said stream is the major contributor and tobacco is the minor contributor, and means to combine the results of the operation of both said detecting means to provide a measure of the quantity present of that material which is the major contributor to the response of one detecting means, substantially independent of the quantity present of that material which is the minor contributor to the response of the same detecting means.

2. A tobacco manipulating machine, comprising tobacco feeding mechanism for feeding tobacco from a mass of entangled shredded tobacco, a part for receiving tobacco from said mechanism, said part comprising a conveyor, to convey the tobacco as a stream, a second conveyor to receive successive portions of tobacco from the first said conveyor, means progressively to fold a continuous wrapper to enclose said received portions of tobacco and form a rod, means to sever said rod into lengths, measuring means responsive to variations in the mass of tobacco carried by one of said conveyors, and means controlled by the measuring means to vary the speed of the second said conveyor and of the means to sever the rod, independently of the tobacco feeding means so as to effect a correction for increases or decreases in the mass of tobacco so measured.

3. A continuous rod cigarette-making machine comprising tobacco feeding mechanism to feed cut tobacco from a bulk supply and driving devices for said mechanism, said mechanism including a tape for conveying distributed tobacco filler, tobacco forwarding means which comprises a conveyor device adapted to feed a paper web and which receives tobacco fed from the tobacco feeding mechanism and feeds it as a filler on said paper web, driving devices for said conveyor device, measuring means for measuring the mass of the said tobacco filler as it passes said measuring means and means controlled by the measuring means capable of changing the ratio of the speed of the conveyor device to the speed of the tobacco feeding mechanism by varying the speed of the conveyor device so as to effect a correction for increases or decreases in the mass of tobacco so measured.

4. A continuous rod cigarette-making machine comprising tobacco feeding mechanism to feed cut tobacco from a bulk supply and driving devices for said mechanism, tobacco forwarding means which comprises at least two conveyor devices the last of which is adapted to carry a paper web and the first of which is adapted to receive tobacco from the tobacco feeding mechanism and to convey the tobacco so received as a filler and wherein the said filler is fed from the first of said conveyor devices to the last of said conveyor devices, driving devices for said conveyor devices, measuring means for measuring the mass of tobacco in the tobacco filler and means controlled by the measuring means capable of changing the ratio of the speed of the said last conveyor device to the speed of the tobacco feeding mechanism by varying the output speed of said last conveyor device relative to the speed of the said first conveyor device feeding tobacco toward it, so as to effect a correction for increases or decreases in the mass of tobacco so measured.

5. A continuous rod cigarette-making machine comprising tobacco feeding mechanism to feed cut tobacco from a bulk supply and driving devices for said mechanism, tobacco forwarding means which comprises at least three separate conveyor means the last of which is adapted to carry a paper web and the first of which is adapted to receive tobacco from the tobacco feeding mechanism and to convey the tobacco so received as a filler and wherein the said filler is fed therefrom as a filler to the last of said conveyor means through the second of said conveyor means, driving devices for all said conveyor means, measuring means for measuring variations in the mass of tobacco in the tobacco filler and means controlled by the measuring means capable of changing the ratio of the speed of the said last conveyor means to the speed of the tobacco feeding mechanism by varying the output speed of said last conveyor means relative to the speed of the said first conveyor means feeding tobacco toward it, so as to effect a correction for increases or decreases in the mass of tobacco so measured.

6. A machine as claimed in claim 4 wherein the measuring means is positioned some distance in advance of the position where the speed change takes place, whereby the effect of the time lag occurring when effecting the speed change of the said last conveyor device is reduced.

7. A machine as claimed in claim 3 wherein the measuring means generates an electrical signal of a magnitude varying with the quantity or mass of tobacco in the measured tobacco filler and comprising means controlled by the measuring means capable of effecting continuous control of the machine by varying the speed of said conveyor device approximately in accordance with a predetermined function of the variation in said signal.

8. A machine as claimed in claim 3 wherein the means controlled by the measuring means varies, within predetermined limits, the speed at which the tobacco carried on the conveyor device which carries the paper web is caused to move and wherein additional means controlled by said measuring means are provided for altering the speed of the tobacco feeding mechanism when deviations in the quantity of tobacco passing the measuring means are beyond said limits.

9. A machine as claimed in claim 3 including a cut-off mechanism and means for forming a wrapped rod wherein the tobacco filler and paper web are carried on said conveyor to said cut-off operating mechanism operating in timed relationship with said conveyor for severing the rod into sections and wherein the means for varying the speed of said conveyor varies the speed of the cut-off mechanism in proportion whereby the means controlled by the measuring means varies the speed of the paper web so as to reduce the output of the machine in cigarettes of a given length if the quantity of tobacco passing the measuring means is below, or to increase the said output if the said quantity is above, a desired value.

10. A machine as claimed in claim 3 wherein the tobacco feeding mechanism is of the kind in which tobacco is showered.

11. A machine as claimed in claim 3 and having a part along which tobacco and a continuous wrapper are conveyed to form a wrapped rod, said part comprising a conveyor for said wrapper, a cut-off for severing said rod into sections, the tobacco feeding mechanism being of the kind in which tobacco is disentangled and thrown and which is arranged to shower tobacco to said part, and wherein the means controlled by the measuring means is capable of varying the speed of the tobacco feeding mechanism, in addition to varying the speed of said conveyor and the speed of the means for severing the rod into sections, and is adapted to vary the speed of the conveyor and of the severing means independently of, and in addition to, the varying of, the speed of the tobacco feeding mechanism.

12. A machine as claimed in claim 11 wherein the means controlled by the measuring means is adapted to vary the speed of the conveyor and cut-off within certain limits and wherein the speed of the tobacco feeding mechanism is altered when deviations over a suitable period of time in the quantity of tobacco passing the measuring means are beyond such limits.

13. A machine as claimed in claim 3 wherein the measuring means comprises a radioactive source of penetrative radiation, means for moving a tobacco filler in a definite path between said source and means responsive to rays from said source, an amplifier responsive to the current produced in or due to the last said means and arranged to amplify a voltage derived from said current whereby voltage changes due to variations in the tobacco filler from the desired mass, and including a speed control device having controls operated by said voltage changes for altering the speed of the paper carrying conveyor device.

14. A machine as claimed in claim 13 wherein the speed control device comprises a magnetic coil coupled to the circuit of said amplifier, an oil unit having a control valve which is actuated by said magnetic coil, movements of the oil unit causing an increment (positive or negative) to be added to the speed of the conveyor device, which carries the paper web.

15. A machine as claimed in claim 13 comprising a second radioactive source, means responsive to rays from said source with a material mass between them having a ray absorption equivalent to that produced when a tobacco filler of the desired mass is passing between the first radioactive source and its associated responsive means, the responsive means associated with the second radioactive source being electrically in opposition to the responsive means of the first radioactive source so that any current resulting from the measurement is the difference between the currents in each responsive means.

16. A machine as claimed in claim 13 wherein the voltage developed by the current produced in the ray responsive means is offset by feedback from an adjustable source of voltage to produce a counter voltage equivalent to that developed by the current in the responsive means when the tobacco filler being measured is of the desired quantity.

17. A machine as claimed in claim 3 wherein the detector means is so located with respect to the tobacco forwarding means as to constitute a closed loop system.

18. A machine as claimed in claim 3 comprising electrodes, an amplifier means for measuring the moisture content of the tobacco, measurement being effected, for example, by measuring the resistance of a predetermined mass of the tobacco positioned between said electrodes, a bridge circuit having a tube in one arm thereof, said electrodes being connected in said bridge circuit whereby the moisture content of the cut tobacco may be measured by positioning a predetermined mass of tobacco between said electrodes and determining the resistance of said tobacco mass whereby changes in moisture content from a predetermined value vary the grid voltage of said tube, a relay adapted to be actuated by said voltage changes, a circuit connecting said amplifier and said bridge circuit, and a variable source of voltage controlled by said relay whereby positive or negative voltages of values proportional to said changes are injected into said connecting circuit between said amplifier and said bridge circuit.

19. A continuous rod cigarette-making machine comprising mechanism wherein a moving stream of tobacco containing moisture having a greater proportion by weight of tobacco than of moisture is subjected to measuring operations, said mechanism comprising measuring means which is responsive to total mass of tobacco and moisture in the stream, the tobacco present being the major contributor and the moisture present being the minor contributor to the response in said measuring means, and comprising further measuring means to whose response moisture in the said stream is the major contributor and tobacco is the minor contributor, and means to combine the results of the operation of both said detecting means to provide a result which in effect is a measure of the quantity of tobacco present.

20. A continuous rod cigarette-making machine comprising mechanism wherein a moving stream of tobacco containing moisture having a greater proportion of tobacco than of moisture is subjected to measuring operations, said mechanism comprising measuring means which is responsive to total mass of tobacco and moisture in the stream, the tobacco present being the major contributor and the moisture present being the minor contributor to the response in said measuring means, and comprising further measuring means to whose response moisture in said stream is the major contributor and tobacco is the minor contributor, and means to combine the results of the operation of both said measuring means to obtain a measure of the quantity of tobacco present substantially independent of the quantity of moisture present.

21. A continuous rod cigarette-making machine comprising mechanism wherein cut tobacco containing moisture is fed from a bulk supply and is manipulated in said mechanism wherein the tobacco containing moisture in said mechanism has a greater proportion of tobacco than of moisture, said mechanism comprising measuring means which is responsive to total mass of tobacco and moisture in a stream of tobacco fed in said mechanism, the tobacco being the major contributor and moisture the minor contributor to the response in said measuring means, and comprising further measuring means arranged to effect a response to tobacco in said mechanism, said further measuring means comprising means to measure the electrical properties of the tobacco, whereby in its response moisture in the tobacco is the major contributor and tobacco is the minor contributor, and means to combine the results of the operation of both said measuring means to provide a result which in effect is a measurement of the quantity of tobacco present in said stream.

22. A continuous rod cigarette-making machine comprising mechanism wherein cut tobacco containing moisture is fed from a bulk supply and is manipulated in said mechanism wherein the tobacco containing moisture in said mechanism has a greater proportion of tobacco than of moisture, said mechanism comprising measuring means which is responsive to total mass of tobacco and moisture in a stream of tobacco fed in said mechanism, the tobacco being the major contributor and moisture the minor contributor to the response in said measuring means, and comprising further measuring means arranged to effect a response to tobacco in said mechanism, said further measuring means comprising means to measure the electrical properties of the tobacco, whereby in its response moisture in the tobacco is the major contributor and tobacco is the minor contributor, and means to combine the results of the operation of both said measuring means to provide a measure of the quantity of the tobacco present in said stream substantially independent of the quantity of moisture present.

23. A continuous rod cigarette-making machine comprising tobacco feeding mechanism to feed cut tobacco from a bulk supply, means for showering the tobacco from said mechanism, a conveyor running lengthwise of the shower to intercept the showered tobacco and feed the tobacco thereon, as a stream, a further conveyor adapted to receive tobacco from the first said conveyor, measuring means for measuring variations in the mass of tobacco on one of the said conveyors and means controlled by the measuring means capable of changing the ratio of the speed of the second said conveyor to the speed of the tobacco feeding mechanism by varying the output speed of said second conveyor relative to the speed of the first conveyor so as to effect a correction for increases or decreases in the mass of tobacco so measured.

24. A machine as claimed in claim 14 including a differential gear provided with a sun gear, a planet arm and an output shaft, said conveyor device which carries the paper being driven by said differential gear, the movement of said oil unit being adapted to shift said sun gear whereby an additional increment of speed (positive or negative) is imparted to the planet arm of said differential gear whereby the output shaft of said differential gear has its speed changed.

25. Apparatus as claimed in claim 18 comprising means for abstracting a sample of filler tobacco whereby changes in the moisture content of said filler as determined by said bridge means may be used to vary the said grid voltage of said tube when the moisture content differs from a predetermined value.

26. A machine as claimed in claim 23 wherein the measuring means is positioned some distance in advance of the position where the speed change takes place, whereby the effect of the time lag occurring when effecting the speed change of the said last conveyor device is reduced.

27. Mechanism wherein a moving quantity of moist tobacco, having a greater proportion of tobacco than of moisture, is subjected to measuring operations, said mechanism comprising detecting means which is responsive to total mass of tobacco and moisture in at least a segment of said moving quantity, tobacco being the major contributor and moisture the minor contributor to the response in said detecting means, and comprising further detecting means to whose response moisture in the said segment is the major contributor and tobacco is the minor contributor, and means to combine the results of the operation of both of said detecting means to provide a measure of the quantity present of the material of one of said contributors substantially independent of the quantity present of that material which is the other contributor.

28. Mechanism wherein a moving mass of moist tobacco is subjected to measuring operations, said mechanism comprising detecting means responsive to the total mass of tobacco and moisture under measurement, tobacco being the major contributor and moisture the minor contributor to the response in said detecting means, and comprising further detecting means to whose response moisture is the major contributor and tobacco is the minor contributor, and means responsive to variations in the measurements rendered by both of said detecting means generating an output responsive to variations in a content characteristic of said moist tobacco subjected to measuring operations.

29. Mechanism for measuring the mass per unit length of a moving quantity of moist tobacco which is subjected to varations in its moisture content, comprising first detecting means primarily responsive to the mass of tobacco under measurement and secondarily responsive to the moisture of the tobacco under measurement, second detecting means primarily responsive to the moisture of the tobacco under measurement and secondarily responsive to the mass of the tobacco under measurement, and means for combining the outputs of both of said detecting means to correct the reference measurement basis of one of said detecting means with respect to mass for variations in moisture thereby rendering a measurement of mass substantially independent of moisture variations.

References Cited in the file of this patent

UNITED STATES PATENTS

| | | |
|---|---|---|
| 1,878,109 | Clark | Sept. 20, 1932 |
| 2,055,941 | Newhouse | Sept. 29, 1936 |
| 2,264,725 | Shoupp et al. | Dec. 2, 1941 |
| 2,340,914 | Whitaker | Feb. 8, 1944 |
| 2,349,429 | Herzog | May 23, 1944 |
| 2,456,233 | Wolf | Dec. 14, 1948 |
| 2,460,199 | Taylor et al. | Jan. 25, 1949 |
| 2,519,089 | Whitaker | Aug. 15, 1950 |
| 2,535,027 | Anderson | Dec. 26, 1950 |

FOREIGN PATENTS

| | | |
|---|---|---|
| 587,210 | Great Britain | Apr. 17, 1947 |

OTHER REFERENCES

"Beta Ray Thickness Gage" (publication) from the "Electronics" magazine of October 1947, pages 106 to 112, inclusive.